United States Patent

De Vey et al.

[15] 3,663,832
[45] May 16, 1972

[54] DELAY PICKOFF CIRCUIT
[72] Inventors: William J. De Vey, Beaverton; Lester L. Larson, Portland, both of Oreg.
[73] Assignee: Tektronix, Inc., Beaverton, Oreg.
[22] Filed: Mar. 17, 1971
[21] Appl. No.: 125,211

[52] U.S. Cl. .............................. 307/228, 307/293, 307/322
[51] Int. Cl. ................................................ H03k 4/08
[58] Field of Search .......................... 307/228, 293

[56] References Cited

UNITED STATES PATENTS 3,339,088   8/1967   Dillard .................................. 307/228
3,344,285   9/1967   Frye ...................................... 307/228

Primary Examiner—Donald D. Forrer
Assistant Examiner—Harold A. Dixon
Attorney—Buckhorn, Blore, Klarquist & Sparkman

[57] ABSTRACT

A delay pickoff circuit initiates the generation of the ramp voltage of a delayed sweep generator of an oscilloscope in response to a comparison of an adjustable voltage from a delay time multiplier in a voltage comparator with the ramp voltage of a delaying sweep generator. The circuit utilizes a delaying sweep start gate voltage, which initiates the generation of the ramp voltage of the delaying sweep generator, to cause starting of the delayed sweep generator with less time delay after the start of the delaying sweep generator than is possible in prior circuits. This delaying sweep start gate voltage is employed to supply current to a tunnel diode which causes the tunnel diode to change from its low to high voltage state to thereby cause production of a delayed sweep start gate voltage when this operation of the tunnel diodes is enabled by a signal from the comparator as a result of setting the delay time multiplier at its zero delay setting. Current derived from the delaying sweep start voltage also conditions the tunnel diode for a similar change as a result of a signal from the comparator produced by a voltage comparison when the multiplier is set for substantially greater delays. A voltage derived from the delaying sweep start gate voltage and having a lesser rise time than the delaying sweep start gate voltage is employed to supply a part of this current to the tunnel diode in order to smooth the transition between these two conditions of operation of the tunnel diode.

7 Claims, 2 Drawing Figures

Patented May 16, 1972

3,663,832

WILLIAM J. DEVEY
LESTER L. LARSON
INVENTORS.

BY

BUCKHORN, BLORE, KLARQUIST & SPARKMAN
ATTORNEYS 3,663,832

DELAY PICKOFF CIRCUIT

BACKGROUND OF THE INVENTION

Precision oscilloscopes usually have two separate horizontal sweep generator circuits each capable of generating a sweep voltage ramp. One of these, called the delaying sweep generator, has is operation initiated by a trigger pulse from a trigger generator and is employed, in conjunction with a voltage comparator and a time delay multiplier providing an adjustable voltage, to delay the start of generation of a ramp voltage by the other sweep generator, called the delayed sweep generator. The adjusted voltage from the sweep time multiplier is compared in the voltage comparator with the ramp voltage generated by the delaying sweep generator to produce an output from the comparator which initiates the operation of the delayed sweep generator when the ramp voltage of the delaying sweep generator equals the adjusted voltage. One important use of the delayed sweep is to enable a small portion of a waveform, which may be spaced any desired distance along the waveform from the portion of such waveform corresponding in time to the trigger pulse, to be selected and magnified horizontally so as to extend across a major portion of the screen of the oscilloscope.

Prior circuits have depended solely upon the time delay afforded by the comparison of the adjustable voltage from the time delay multiplier with the voltage of the ramp generated by the delaying sweep generator to delay the start of the delayed sweep generator. There is always a substantial time interval between the production of a sweep start gate voltage as a result of the delivery of a trigger pulse to a sweep generator circuit and the actual start of the ramp voltage of such sweep generator. Since the operation of the delayed sweep generator was not initiated in the prior circuits until the voltage ramp of the delaying sweep generator was actually being generated, it was impossible to cause the delayed sweep generator to start until after termination of such time interval even though the delay time multiplier was set for zero delay. A portion of the waveform immediately following the portion of the waveform corresponding to the trigger pulse could therefor not be displayed when employing the delayed sweep. The portion of the waveform which could not be displayed during the delayed sweep in prior circuits can become a material portion of the total waveform being displayed by a high speed oscilloscope capable of displaying waveforms of high rise and fall times or of high frequency.

SUMMARY OF THE INVENTION

In accordance with the present invention a fast rise time sweep start gate voltage for the delaying sweep generator produced in response to a trigger pulse, with very slight delay after such trigger pulse, is employed to produce a similar sweep start gate voltage for the delayed sweep generator, also with very slight delay, when the delay time multiplier is set for zero time delay. At this setting of the delay time multiplier, the voltage comparator associated with the delay time multiplier furnishes an enabling signal enabling the sweep start gate voltage for the delaying sweep generator to cause such production of the sweep start gate voltage for the delayed sweep generator. Since the time interval between the production of a sweep start gate voltage of a sweep generator and the start of the voltage ramp is essentially the same for both the delaying sweep and the delayed sweep, the delay of the start of the delayed sweep after the start of the delaying sweep, when the delay time multiplier is in the zero delay position, can be made as short as 3 to 5 nanoseconds as compared to approximately 50 to several hundred nanoseconds in prior circuits.

When the delay time multiplier is moved a small increment from its zero delay time position, the enabling signal from the voltage comparator decreases so as to no longer enable the delaying sweep start voltage to produce a delayed sweep start gate voltage. The delaying sweep start gate voltage is however sent through an amplifier to produce a slower rise time voltage and a relatively slow rise time signal derived from the output of the amplifier is added to the decreased enabling signal voltage from the comparator. For small displacements of the delay time multiplier from its zero delay position, the effect is the same as if the slow rise time voltage derived from the delaying sweep start gate voltage in the amplifier were added to the delaying sweep start gate voltage and the resulting voltage were still enabled by the decreased signal from the comparator to produce the delayed sweep start gate voltage. The result is that the production of the delaying sweep start gate voltage is delayed by the slow rise time signal.

As the delay time multiplier is moved further away from its zero delay position, the enabling signal from the comparator prior to the start of the delaying sweep become too small to enable the slow rise time signal to cause production of a delayed sweep start gate voltage in the absence of a comparison signal from the comparator, produced by comparing the voltage from the delay sweep multiplier and the voltage from the delaying sweep voltage ramp. The delaying sweep start gate voltage in conjunction with the slow rise time voltage becomes an enabling voltage for such comparison signal. It is thus possible to produce a smooth transition between the condition at zero setting of the delay time multiplier when the signal from the comparator acts as an enabling signal for producing a delayed sweep start gate voltage responsive to the delaying sweep start gate voltage and the condition when the delaying sweep start gate voltage becomes the primary enabling signal for producing a delayed sweep start gate voltage responsive to a comparison signal from the comparator. In operation of the circuit just described, the delay of the start of the delayed sweep relative to the start of the delaying sweep can be made substantially a linear function of the angular setting of the dial of the delay time multiplier.

It is therefor an object of the invention to provide a delay pickoff circuit for an oscilloscope in which the minimum delay between the start of a delaying sweep voltage ramp and the start of a delayed sweep voltage ramp is reduced to a small fraction of that of prior circuits while at the same time providing a delay of the start of the delayed sweep voltage ramp which is a substantially linear function of the angular position of a delay time multiplier dial.

DESCRIPTION OF THE PREFERRED EMBODIMENT

Figure 1:
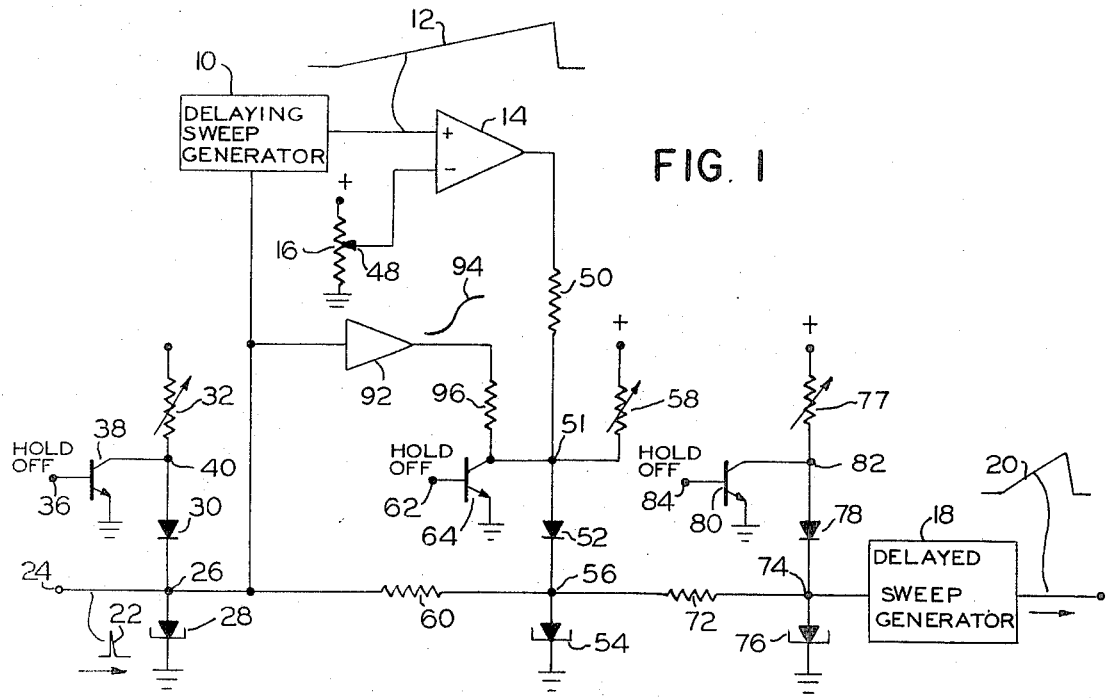
FIG. 1 is a partly schematic diagram and partly a block diagram illustrating a delay pickoff circuit in accordance with the present invention.

A delaying sweep generator 10 for producing a delaying sweep voltage ramp 12, in conjunction with a voltage comparator 14 and a delay time multiplier 16 provides a signal used to start a delayed sweep generator 18, to generate a delayed sweep voltage ramp 20. The generation of the delayed sweep voltage ramp 20 is started at the expiration of a delay time determined by a comparison in the voltage comparator 14 of the delaying voltage ramp 12 with an adjustable voltage from the delay time multiplier 16, for major delay times.

The generation of the ramp 12 by the delaying sweep generator is initiated by the application of a positive trigger pulse 22 from an input terminal 24 through a junction 26 to the anode of a delaying sweep start tunnel diode 28 connected between the junction 26 and ground or the other common connection. The tunnel diode 28 is normally in its low voltage state but has its anode connected through a diode 30 and an adjustable bias resistor 32 to a source of positive potential to receive sufficient bias current to maintain the tunnel diode 28 in its high voltage state whenever it is changed to such high voltage state. The positive trigger pulse 22 causes the tunnel diode 28 to change to its higher voltage state to produce a delaying sweep start gate voltage 34, shown in FIG. 2. The tunnel diode can be reset to its low voltage state at any time by supplying a positive voltage through a terminal 36 to the gate of an NPN transistor 38 having its emitter connected to ground and its collector connected to a junction 40 between the resistor 32 and the diode 30. The transistor 38 is normally turned off but the application of a positive voltage to the terminal 36 will cause the transistor 38 to turn on and short circuit the tunnel diode 28 to cause it to return to its low voltage state.

The delaying sweep start gate voltage produced by the tunnel diode 28 has a fast rise time leading edge 42 and is delivered to the delaying sweep generator 10 to initiate the operation of this sweep generator. The delaying sweep start gate 34 is employed in the delaying sweep generator 10 to produce a delaying sweep gate voltage 44 which also has a fast rise time leading edge 46 which actually starts the production of the ramp voltage 12. There is a substantial delay between the leading edge 42 of the delaying sweep start gate voltage 34 and the leading edge 46 of the delaying sweep gate voltage 44. The reason for this delay is that the delaying sweep start gate voltage 34 is first employed to actuate a delaying sweep multivibrator, the output of which is then amplified to produce the delaying sweep gate voltage 44 which actually starts the delaying sweep generator. This delay may be a substantial portion of the length of the delaying sweep voltage ramp 12. The vertical input signal to the oscilloscope providing the waveform to be displayed can, however, be sent through a delay line so that it is delayed for the same time interval as the delayed sweep gate voltage 44 delayed with respect to the delaying sweep start gate voltage 34 so that the trace of the waveform to be displayed by the oscilloscope starts at the same time as the delaying sweep ramp voltage 12.

Prior delaying pickoff circuits have exclusively employed a rise in voltage of the delaying sweep ramp voltage 12 to produce a comparison signal in a comparator and then have employed this comparison signal to produce a delayed sweep start gate voltage. Since the circuits of a delayed sweep generator are substantially the same as those of a delaying sweep generator, there is a delay between the leading edge of this delayed sweep start gate voltage of the delayed sweep generator and the start of the delayed sweep voltage ramp of the delayed sweep generator similar to the delay between the leading edge 42 of the delaying sweep start gate voltage 34 and the start of the delaying sweep ramp voltage 12 of the delaying sweep generator 10 discussed above. This means that the portion of the input waveform immediately following the beginning of the delaying sweep ramp voltage cannot be displayed at the horizontal magnification afforded by the delayed sweep voltage ramp.

The comparator 14 of the present circuit has a movable contact 48 and it will be understood that this contact is moved by a manual control element providing an accurately calibrated indication of the position of the contact. The comparator produces a small positive enabling voltage as an output when such control element and the movable contact 48 of such multiplier are in a zero time delay position. This can be accomplished, for example, by offsetting the quiescent voltage of the delaying sweep generator 10 from ground potential in a positive direction to produce a constant positive output voltage from the comparator 14 when the delaying sweep voltage ramp 12 is not being generated by the sweep generator 10. This output voltage causes current flow to ground through a resistor 50 to a junction 51 and then through a diode 52 and a delay gate tunnel diode 54 having its anode connected to a junction 56 between the diode 52 and the tunnel diode 54. This current plus an additional current through an adjustable bias resistor 58 from a source of positive potential is not sufficient to change the tunnel diode 54 from a low voltage state to a high voltage state but is sufficient to enable the delaying sweep start gate voltage produced at the junction 26, when the tunnel diode 28 is changed from its low voltage state to its high voltage state, to cause the tunnel diode 54 to change to its high voltage state as a result of current flow through a resistor 60 connected between the junctions 26 and 56. The current through resistors 50 and 58 is, however, sufficient to hold the tunnel diode 54 in its high voltage state. The tunnel diode 54 can be reset to its low voltage state at any time by applying a positive voltage to a terminal 62 connected to the base of a normally turned off NPN transistor 64 having its emitter connected to ground and its collector connected to the junction 51. This turns on the transistor 64 to short circuit the tunnel diode 54.

Figure 2:
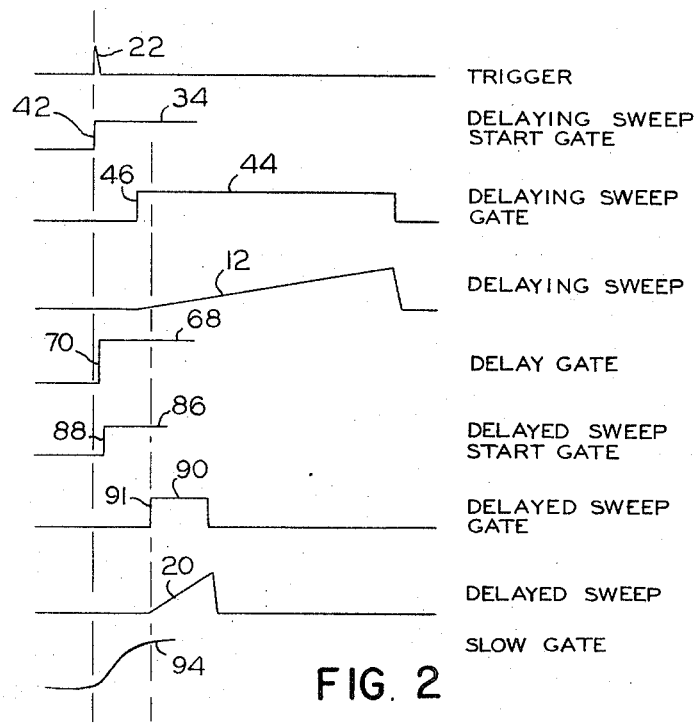
FIG. 2 is a view showing waveforms useful in explaining the operation of the circuit of FIG. 1.

The change of a tunnel diode 54 to its high voltage state produces a fast rise time delay gate voltage 68 shown in FIG. 2. Leading edge 70 of this delay gate voltage is produced with very little time delay after the leading edge 42 of the delaying sweep start gate voltage 34, this slight delay being primarily caused by the charging of the small distributed capacitances of the elements connected to the junction 56 through a resistor 60. The delay gate voltage 68 causes current to flow through a resistor 72 through a junction 74 and a delayed sweep gate tunnel diode 76 connected between the junction 74 and ground to cause this tunnel diode to change from a low voltage state to a high voltage state. The tunnel diode 76 is also supplied with the bias current from a positive source of potential through an adjustable bias resistor 77 and a diode 78 which is not sufficient to cause the tunnel diode 76 to change from a low voltage state to a high voltage state but is sufficient to hold such tunnel diode in its high voltage state. An NPN transistor 80 has its emitter connected to ground and its collector connected to a junction 82 between the resistor 76 and diode 78. The transistor 80 is normally turned off but can be turned on by a positive voltage supplied to the terminal 84 to short circuit the tunnel diode 76 and return it to its low voltage state.

The change of the tunnel diode 76 from its low voltage state to a high voltage state due to current through the resistor 72 caused by the change of the tunnel diode 54 to its high voltage state, produces a delayed sweep start gate voltage 86, shown in FIG. 2, which also has a fast rise time leading edge 88. The fast rise time leading edge 88 of the delayed sweep start gate voltage 86 occurs after a very slight delay from the production of the leading edge 70 of the delay gate 68.

The delayed sweep gate voltage 86 is delivered to the delayed sweep generator 18 and produces a delayed sweep gate voltage 90. This delayed sweep gate voltage 90 also has a fast rise time leading edge 91 which is delayed with respect to the leading edge 88 of the delayed sweep start gate voltage 88 by a time interval which is substantially the same as the time interval between the leading edge 42 of the delaying sweep start gate voltage 34 and the leading edge of the delaying sweep gate voltage 44. The delayed sweep voltage ramp 20 starts at the same time as the leading edge 91 of the delayed sweep gate voltage 90 and therefor this delayed sweep voltage ramp starts with very slight delay after the start of the delaying sweep ramp voltage 12. The delay between the start of the delaying sweep ramp voltage 12 and the start of the delayed sweep ramp voltage 20 is substantially the same as the delay between leading edge of the trigger pulse 22 and leading edge 88 of the delayed sweep start gate voltage 86. This delay may be made as low as 3 to 5 nanoseconds. The enabling voltage from the comparator 14 when the contact 48 of the delay time multiplier is in its zero delay position, thus enables a delayed sweep ramp voltage 20 to be started almost immediately after the start of a delaying sweep ramp voltage 12 so that the portion of the waveform being displayed immediately after the start of the delaying sweep ramp voltage 12 can thus be displayed during the delayed sweep ramp voltage 20 generated by the delayed sweep generator.

If the contact 48 of the delay time multiplier is moved a small increment away from its zero delay time position, the enabling voltage from the comparator 14 prior to the start of the delaying sweep ramp voltage 12 is decreased and insufficient current is delivered to the tunnel diode 54 to enable this tunnel diode to be changed from a low voltage state to a high voltage state by the delaying sweep start gate voltage 34 from the tunnel diode 28. This condition exists until the voltage of the delaying sweep ramp voltage 12 has increased sufficiently to produce a positive comparison voltage output from the comparator. With the circuit thus far described, the result would be that the tunnel diode 54 would not change to its high voltage condition until after the delaying sweep ramp voltage 12 has started and reached a voltage sufficient to again increase the output voltage from the comparator 14.

To correct this condition just described, an amplifier 92 is connected to receive the delaying sweep start gate voltage 34 and produces a slow gate voltage 94 having a low rise time as compared to the delaying sweep start gate voltage as an output. This output is connected through a resistor 96 to the junction 40 so that a resulting current having substantially the form of the slow gate voltage 94 is also delivered to the tunnel diode 54. This additional current causes tunnel diode 54 to change from its low voltage state to its high voltage state at progressively later time as the movable contact 48 of the delay time multiplier is moved in small incrinemts away from its zero delay time position. For such small increments the slope of the slow gate voltage 94 is sufficient to produce an increasing current through the resistor 96 which more than compensates for the decrease in current through the resistor 50 resulting from such movement of the movable contact 48.

A conventional positive holdoff voltage from the delaying sweep generator 10 is applied to the terminals 36 and 62 at the end of the delaying sweep gate 44 to reset the tunnel diodes 28 and 54 and this voltage is maintained for a hold off period of sufficient time to enable all of the circuits of the delaying sweep generator including the usual integrating circuit of such generators to reach a quiescent state. A similar hold off voltage from the delayed sweep generator is applied to the terminal 84 connected to the gate of the transistor 80 to reset and hold off the tunnel diode 76. This tunnel diode is employed to provide another delay mode of operation in which the delayed sweep generator is initiated by another trigger pulse after the delay by circuits which are not shown, but is included in the disclosure in order to show the reason for the minimum time delay realizable in a practical oscilloscope between the start of the delaying sweep ramp voltage and the delayed sweep ramp voltage.

From the above description of the preferred embodiment, it is apparent that for settings of the delay time multiplier 16 at or near zero time delay, a signal from the comparator 14 which decreases with increase of the delay time setting, enables a signal including the delaying sweep start gate voltage 42 plus a lower rise time voltage 96 derived from such delaying sweep start gate voltage 42 to produce a delayed sweep start gate voltage 91. As the time delay setting of the comparator is further increased a comparison voltage again increases the signal from the comparator. There is a crossover point at which the delaying sweep start gate voltage 44 plus the slow rise time voltage 94 becomes the enabling signal for the comparison signal from the comparator. The slow gate voltage 94 smoothes the transition between the operation of the circuit at the zero delay time setting of the delay time multiplier and settings of this delay time multiplier remote from the zero delay time setting to provide a delay time which is a substantially linear function of the delay time setting of the delay time multiplier.

We claim:

1. A delay pickoff circuit for an oscilloscope having a delaying sweep generator, a delayed sweep generator, a delaying sweep starting means responsive to a trigger pulse for initiating the operation of said delaying sweep generator to generate a delaying sweep ramp voltage, and a delay time multiplier provided with a control element movable from a zero delay position through a range of delay positions for supplying an adjustable voltage, said delay pickoff circuit comprising:

a voltage comparator for comparing the voltage of said ramp with said adjustable voltage and for providing an enabling signal when said control element is in said zero delay position and an actuating signal when said control element is in a delaying position remote from said zero delay position;

delayed sweep starting means enabled by said enabling signal for actuation by said delaying sweep starting means to initiate the operation of said delayed sweep generator to generate a delayed sweep ramp voltage when said control element is in said zero delay position;

and enabling means for causing said delayed sweep starting means to be enabled by a signal from said delaying sweep generator starting means so as to be actuated by said actuating signal for initiating the operation of said delayed sweep generator to generate a delayed sweep ramp voltage when said control element is in said position remote from said zero delay position.

2. The delay pickoff circuit of claim 1 in which said enabling means includes:

transition means responsive to a signal from said delaying sweep starting means for producing and transmitting a signal to said delayed sweep starting means for smoothing the transition between the enabling of said delayed sweep starting means by said signal from said comparator when said control element is in said zero delay position and the enabling of said delayed sweep starting means by said signal from said delaying sweep starting means when said control means is in said position remote from said zero delay position.

3. The delay pickoff circuit of claim 1 in which:

said voltage comparator decreases said enabling signal as said control element is progressively moved through small increments from said zero delay position;

said delaying sweep starting means includes means for producing a fast rise time delaying sweep starting gate voltage in response to said trigger pulse;

and said transition means includes means for producing a lower rise time signal in response to said delaying sweep starting gate voltage for actuating said delayed sweep starting means with progressively larger delays corresponding to said increments.

4. The delay pickoff circuit of claim 1 in which:

said delayed sweep starting means includes a tunnel diode for producing a fast rise time signal for initiating said operation of said delayed sweep generator;

and said delaying sweep starting means produces a fast rise time signal for initiating said operation of said delaying sweep generator and for transmission to said tunnel diode to cause said tunnel diode to change from a low voltage state to a high voltage state.

5. The delay pickoff circuit of claim 4 which also includes:

transition means for producing a slower rise time signal from said fast rise time signal produced by said delaying sweep starting means and transmitting said slower rise time signal to said tunnel diode for smoothing the transition between the enabling of said delayed sweep starting means by said signal from said comparator when said control element is in said zero delay position and the enabling of said delayed sweep starting means by said delaying sweep starting means when said control means is in said position remote from said zero delay position.

6. The delay pickoff circuit of claim 4 in which:

said delaying sweep starting means includes a tunnel diode for producing said fast rise time signal for transmission to the first mentioned tunnel diode.

7. The delay pickoff circuit of claim 4 which also includes:

a second tunnel diode receiving a fast rise time signal from the first mentioned tunnel diode and producing a fast rise time delayed sweep start gate signal for initiating said operation of said delayed sweep generator.

* * * * *